Oct. 22, 1940.                N. M. FOSTER                2,218,606
                                VALVE
                          Filed Oct. 7, 1938           4 Sheets-Sheet 1
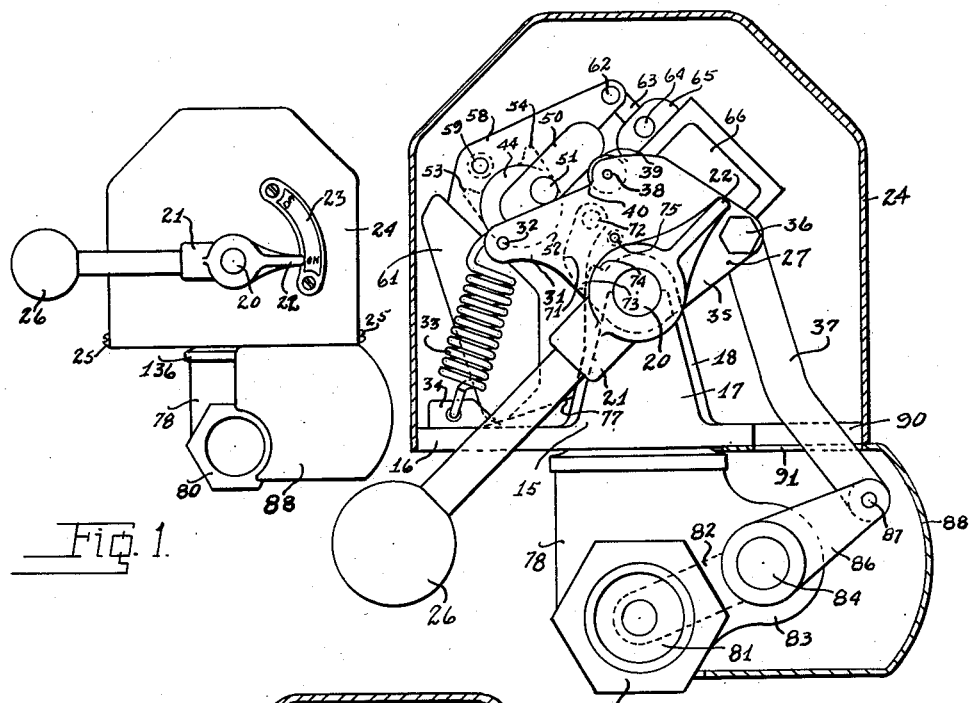
Fig. 1.
Fig. 2.
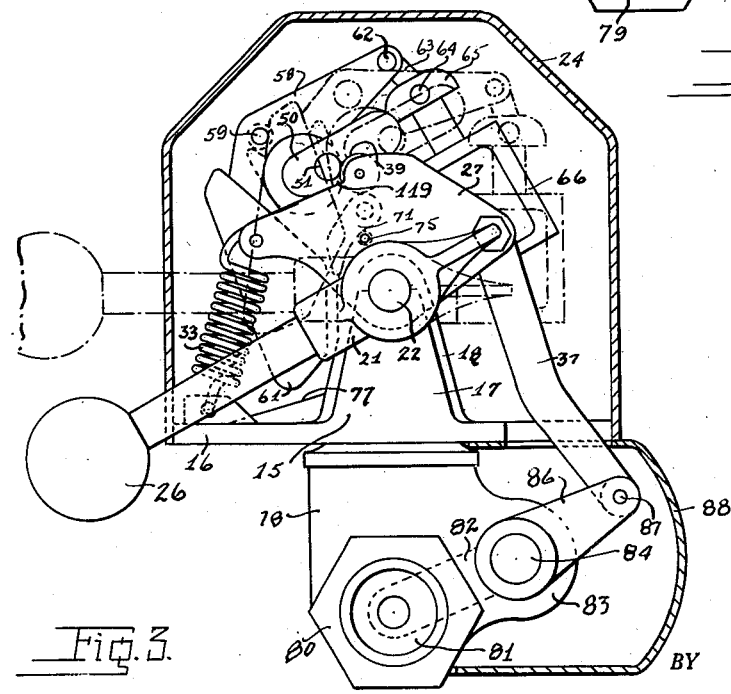
Fig. 3.
INVENTOR.
NORMAN M. FOSTER
BY Joseph A. Rave
ATTORNEYS.

Oct. 22, 1940.  N. M. FOSTER  2,218,606
VALVE
Filed Oct. 7, 1938  4 Sheets-Sheet 2

INVENTOR.
NORMAN M. FOSTER
BY Joseph A. Rave
ATTORNEY.

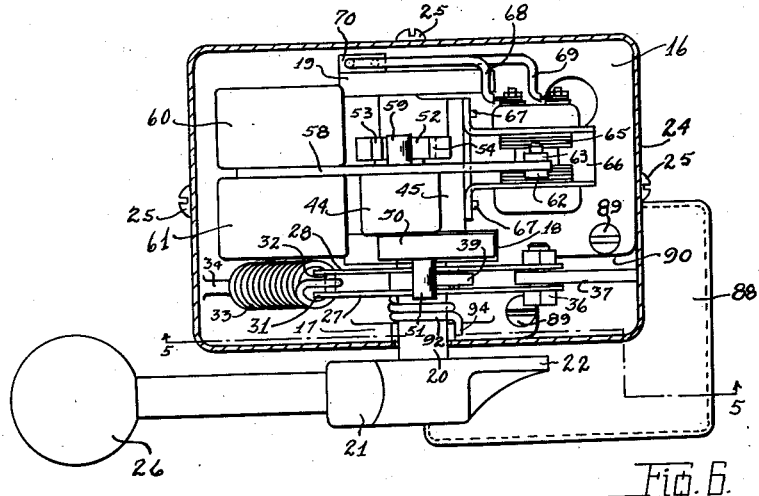
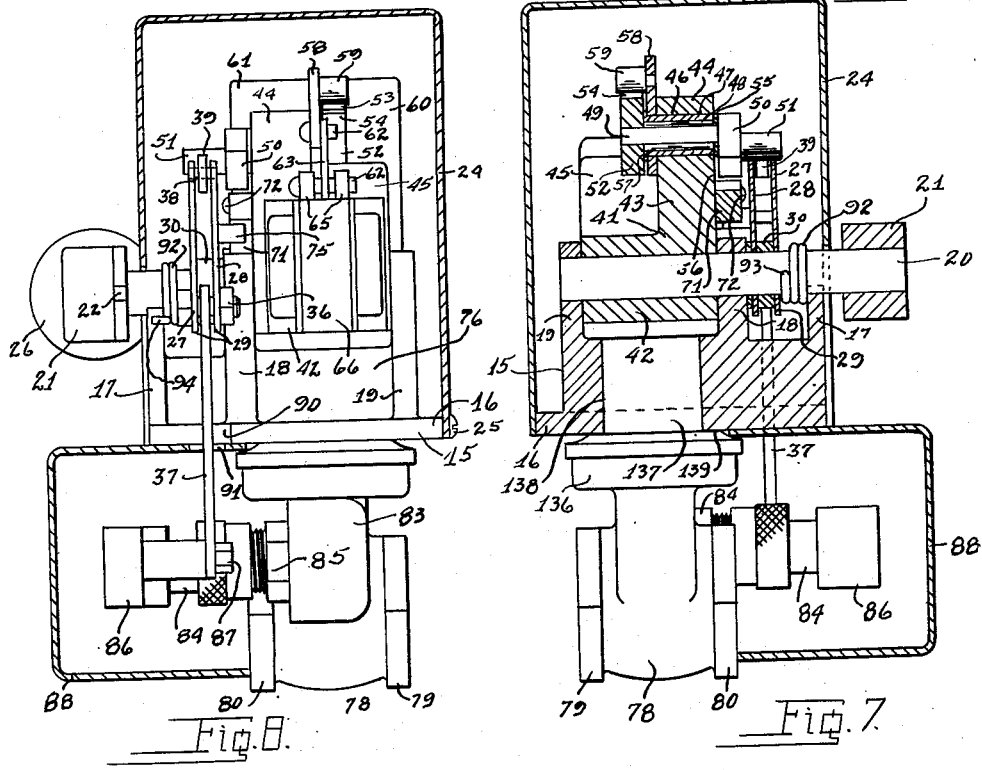

Oct. 22, 1940.   N. M. FOSTER   2,218,606
VALVE
Filed Oct. 7, 1938   4 Sheets-Sheet 4

INVENTOR.
NORMAN M. FOSTER
BY Joseph A Rave
ATTORNEY.

Patented Oct. 22, 1940

2,218,606

UNITED STATES PATENT OFFICE 2,218,606

VALVE

Norman M. Foster, Muncie, Ind., assignor to Western Products, Incorporated, Newcastle, Ind., a corporation of Indiana Application October 7, 1938, Serial No. 233,790

9 Claims. (Cl. 137—139)

This invention relates to improvements in an automatic shut off valve, such as is used for stopping the flow of fluid fuel upon failure of any part of the power system in which it is being used.

Automatic shut off valves, commonly termed in the trade as safety valves, have been used in the past for stopping the flow of fluid fuel, such as combustible gas and combustible oil. In the past, such valves were capable of being opened, even though the system in which they were incorporated was not ready to have the valve opened, or the valve could be propped open even though the safety control switch therefore was in no condition for opening the valve. Such operation of the valve, it is true, was not the intended use of the valve, but it was found that the valve could be so operated or employed, and unscrupulous operators did so with explosions and damage to property as a result.

It is therefore the principal object of the present invention to provide an automatic shut off valve or safety valve which can be opened only when the system in which the valve is used is in the proper condition for having said valve opened.

Another object of this invention is the provision, in an automatic shut off valve, of means which will connect the valve operating mechanism with its handle, only when the system is in the proper condition to have the valve opened.

A further object of this invention is the provision of valve operating means which, upon failure in the power or controlling circuit, will automatically close and cannot be reopened until the cause of the circuit failure has been positively and definitely eliminated.

A still further object of this invention is the provision of a valve, as above identified, which is relatively simple in its construction, requiring a minimum of parts, and having the parts so related to one another in their operation, as to be at all times protected against excessive wear and abuse.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings—

Fig. 1 is a side, elevation view of the valve of this invention.

Fig. 2 is an enlarged, elevational view of the operating and control mechanism of the valve of this invention, showing same in the idle position.

Fig. 3 is a view similar to Fig. 1, showing the position of the operating parts of the valve under certain conditions.

Fig. 6 is a top plan view of the parts when in the position illustrated in Fig. 5, with the covers in section.

Fig. 7 is a vertical, sectional view, taken on line 7—7 of Fig. 5.

Fig. 8 is a rear, elevational view of the parts, taken on line 8—8 of Fig. 5.

Throughout the several views of the drawings, the same or similar reference characters are employed to denote the same or similar parts.

Figure 4:
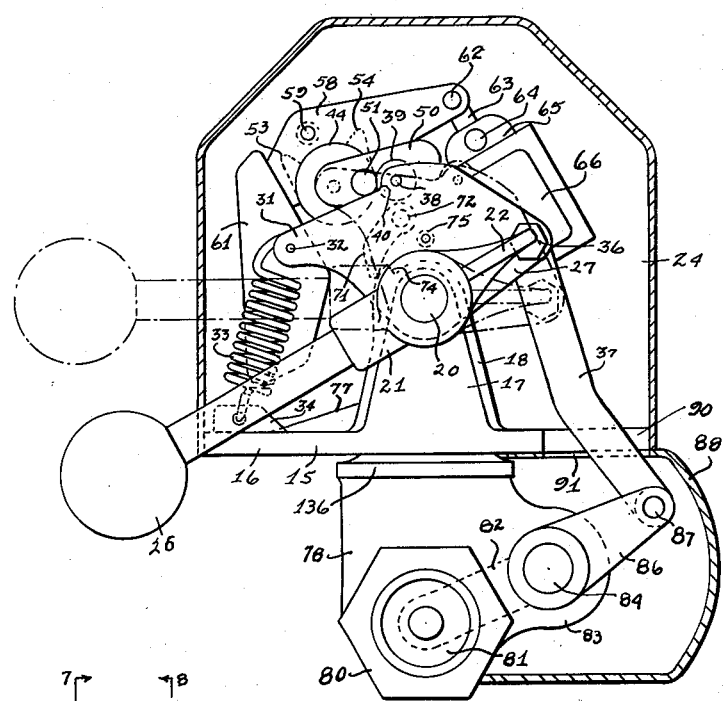
Fig. 4 is a view similar to Fig. 3, showing the position of the parts under conditions other than those illustrated in Fig. 3.

The valve control mechanism comprises a main casting, indicated in general by the reference numeral 15, and comprising a base plate 16, having rising therefrom lugs 17, 18 and 19. The lugs 18 and 19 are provided with aligned apertures, while the lug 17, being shorter in height than the lugs 18 and 19, is provided with a recess in alignment with the apertures. Journaled in said apertures in the lugs 18 and 19, is a shaft 20, which has a portion projecting outwardly of the bed plate 16, and to which projecting portion of the shaft 20 there is secured an operating handle 21. The operating handle 21 is provided with a finger or pointer 22, co-operating with a direction plate 23 mounted on the side of a cover 24. The cover 24 is secured to the base plate 16 by means of screws or the like 25, and completely encloses the valve operating mechanism located above the plate 16. In order to conveniently actuate the handle 21, it is provided, at its outer end, with a suitable grip, shown as a ball 26.

As will be seen in the drawings, the shaft 20 is rotated in a clockwise direction by the handle 21, and in order to insure the return of the shaft 20, or the rotation thereof, in a counter-clockwise direction, use is made of a spring 92 coiled about said shaft around the portion thereof located between the segment plates 27 and 28 and the base plate lug 17. In order to anchor the spring, it has one end 93 inserted in a hole in said shaft and its other end 94 around the lug 17, see Figs. 6 and 7.

Loosely journaled on the shaft 20, and between the lugs 17 and 18, is the valve operating segment, shown in section in Fig. 7, in end elevation in Fig. 8, in top plan in Fig. 6 and in side elevation in Figs. 2, 3 and 4. As shown in these figures the segment comprises a pair of plates 27 and 28, spacedly secured to one another by various pins and bolts, to be subsequently described. The segment plates 27 and 28 each have a portion 29 provided with an aperture, through which the shaft 20 passes, and surrounding said shaft, between said segment plates, is a spacer collar 30. As seen in Figs. 2, 3 and 4, the segment plates have a portion 31 extending to the left of the shaft, through which passes a spacing and connecting pin 32, which also serves for connecting thereto one end of a coiled spring 33. The other end of the spring 33 is anchored in a lug 34 integral with and upstanding from the base plate 16. To the right of the shaft 20, the segment plates have a portion 35, through which passes a spacing and connecting bolt or the like 36 for connecting thereto one end of a link 37. Substantially centrally of the width of the segment plates, they are provided with a spacing and connecting pin 38 which acts as an axle for a roller 39. The upper edge of the segment plates are so formed as to substantially sheath the roller 39, and just to the left of the roller axle 38, the upper edges of the segment plates dip to provide a notch 40, which notch includes, as a portion thereof, the surface of the roller 39. As will be readily seen, the notch 40 has its low point below the center of the axle 38.

Referring again to Fig. 7, the shaft 20 has pinned or otherwise secured to it, between the lugs 18 and 19, a carrier 41. The carrier 41 is in the form of a casting and is provided, at its lower end, with a circular boss 42, through which the shaft 20 passes, and from which rises the portion 43, enlarged and somewhat circular, as at 44 in Fig. 5, at it upper end. Rearwardly or to the right, as seen in Figs. 2, 3, 4 and 5, the carrier casting 41 is provided with a substantially flat web portion 45.

The boss or circular portion 44 of the carrier 41 is provided with a bore 46, into which is pressed a bushing 47. The bushing 47 has mounted therein an antifriction roller bearing 48 for the rock shaft 49. The rock shaft 49 is integral with, or permanently secured to an arm 50. As will be seen particularly in Figs. 2 to 5 inclusive, the arm 50 is connected to the rock shaft 49 in such a way as to extend substantially wholly to the right thereof, and such arm is thereby biased or counterweighted to oscillate about the axis of the shaft 49 in a clockwise direction. Projecting from the arm 50, at a point just to the right of the rock shaft 49, is a pin 51 adapted to ride on the upper edges of the segment plates 27 and 28.

As seen particularly in Fig. 7, the rock shaft 49 projects to the left, beyond the bushing 47, and pinned or otherwise secured to this projecting end of the rock shaft, is a forked member 52, having projecting from its upper end fingers or lugs 53 and 54. It will be appreciated that, since the biased arm 50 is integral with or secured to the rock shaft, and since the forked member 52 is likewise secured thereto, they will move as a unit, and this movement will be unrestricted, due to the fact that the rock shaft 39 is journaled on anti-friction rollers 48. In order to further insure the free movement of the last mentioned parts, a washer 55 is interposed between the biased arm 50 and adjacent face 56 of the carrier 41, which acts as a thrust bearing for these parts. For a similar purpose, the bushing 47 is provided, adjacent the forked member 52, with a radial flange 57, which acts as a thrust bearing.

Mounted on the bushing 47, between the inner face of the radial flange 57 and opposed face of the upstanding portion 43 of the carrier member 42, is an arm, plate or the like 58, much in the order of a beam, and by which term it will be hereinafter so designated. The beam 58 has free movement on the bushing 47, and since the bushing 47 is mounted in the carrier casting 41, it moves therewith. The beam 58 has secured thereto, and projecting from the rear side thereof, as seen in Figs. 2 to 5 inclusive, a pin 59, which lies between the fingers 53 and 54 of the forked member 52. To the left of its mounting, as seen in Figs. 2 to 5 inclusive, the beam has secured thereto a pair of counter weights 60 and 61, tending to rotate the beam 58 in a counterclockwise direction. The beam 58 carries, at its other end, a pivot pin 62 for one end of a link 63, which link has its other end oscillatably connected, as by pin 64, with the movable core 65 of an electro solenoid 66. As seen in Fig. 6, the solenoid 66 is connected, as by bolts 67, with the flat web portion 45 of the carrier 41.

The solenoid 66 has connected to its side, or other binding posts, the lead wires 68 and 69, which are in turn connected in a suitable block 70, secured to the outer face of the lug 19. The purpose for this connection is to prevent breaking of the said leads during the movement of the parts, which later will be described in detail.

Figure 5:
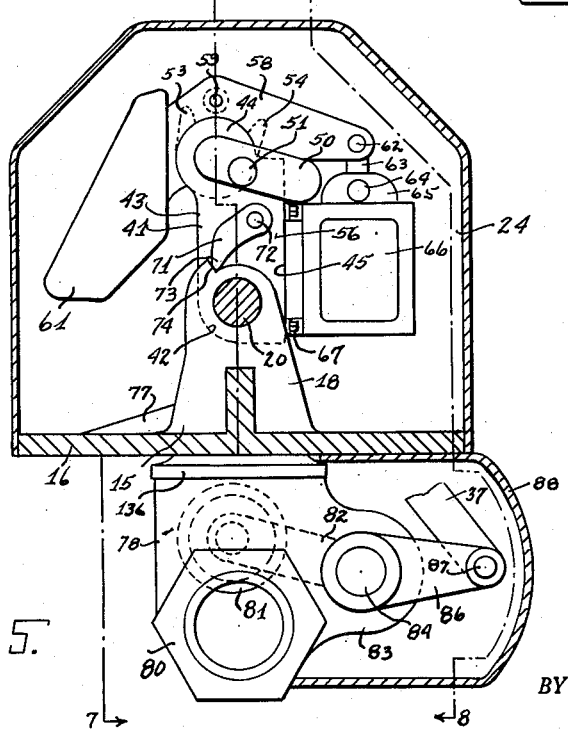
Fig. 5 is a sectional view, taken on a plane just behind the operating handle, and showing the parts in the final position of conditions existing in Fig. 4, as seen from line 5—5 on Fig. 6.

As seen in Fig. 5, the carrier 41 has pivotally mounted on its front face 56, a pawl 71 for pivotal movement around the pin 72. The pawl 71 is adapted to have its nose 73 fall behind a shoulder or stop 74 formed on and integral with the base lug 18. Co-operating with the pawl 71 is a pin 75 which projects rearwardly from the segment plates 27 and 28 toward the face 56 of the carrier casting 41.

As seen in Figs. 6 and 7, the lugs 18 and 19 are joined for a portion of their height by a thickened portion 76, which upstands from the base plate 16. Extending to the left of this thickened portion 76, as seen in Figs. 2 to 5 inclusive, are a pair of inclined lugs 77, located one below each of the beam counter weights 60 and 61, and adapted to intercept said counter weights and stop the movement of the beams, as later will be made clear.

The foregoing control mechanism is mounted as a whole on a valve which, in its entirety, is old and well known. The particular kind of valve here employed and illustrated in the drawings is known as a gate valve, having a body portion 78 with its opposite ends 79 and 80 internally threaded for the reception of suitable sections of pipe. Within the body, and between its ends 79 and 80, there is provided suitable seats for the valve disc or discs 81. The valve disc or discs 81 is connected to one end of an arm 82, which projects rearwardly into a hollow extending portion 83 on the valve body, where it is connected to an oscillatable valve stem 84 provided for rotation or oscillation in the valve body extension 83, and in a bonnet 85 carried by the valve body extension. The valve body 78 carries suitable packing for the stem 84, as is usual practice, and secured to the outer extremity of the stem 84 is a lever 86. The lever 86 has a pivotal connection at 87 with the lower end of the link 37.

The valve stem 84, and parts connected and associated therewith, are enclosed in a suitable guard or cover 88, secured to the base plate 16 by means of screws, bolts or the like 89, see Fig. 6. In order to provide clearance for the link 37, the base plate 16 has its corner removed, as at 90, while the portion of the cover 88, located therebelow, is provided with a registering opening 91.

In order to connect the valve body 78 to the operating mechanism, the said valve body 78 has an internally threaded upper end 136 receiving the threaded end of a plug 137. The plug 137 projects into an aperture 138 formed in the thickened portion 76 of the base plate 16 and is pinned or otherwise secured therein. The plug 137 is further provided with a radial seat 139 on which the under portion of the base plate around the aperture 138 rests.

Figure 10:
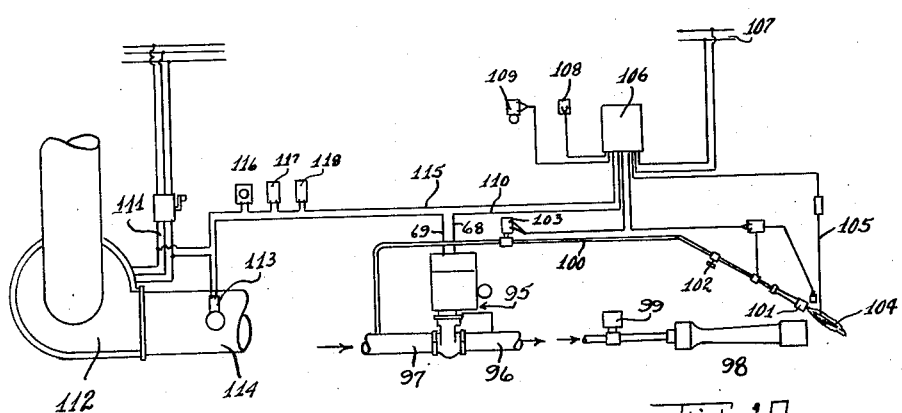

There is illustrated in Fig. 10, to which reference is now to be had, some of the various uses to which a safety valve of this invention is applied. As seen in Fig. 10, the safety valve of this invention is indicated by the reference numeral 95, connected between pipe sections 96 and 97, through which flows the fluid fuel such as gas or oil. The pipe 96 terminates in a burner 98 and the pipe 96 has therein, just ahead of the burner 98, the control valve 99. Coming off of the pipe 97, ahead of the safety valve 95, is the pilot line or pilot fuel supply pipe 100, which terminates in the pilot burner 101, and the pipe 100 has therein the control valve 102, automatic valve 103 and such other auxiliary equipment as is necessary, and which equipment is auxiliary to that protection afforded by the valve of the instant application. Within the pilot flame 104 is the electrode rod 105, electrically connected with a suitable relay mechanism 106, which is in turn electrically connected with a power supply 107. The relay 106 has also connected therewith auxiliary mechanism, such as the push button 108 for operating the pilot automatic valve 103 and a signal 109 for visibly or audibly indicating the interruption of the operation of the system.

The relay 106 is further connected, as by the lead 110, with one of the leads, 68 for example, of the solenoid 66 of the valve controlled mechanism. The other lead 69 of the solenoid 66 extends to the power supply lines 111 which operates the motor of a recirculating or exhaust fan or the like 112. The said second lead 69 of the solenoid 66 has therein included an airflow switch 113 associated with the pipe or duct 114 of the fan 112. The companion lead 115, from the relay 106, is likewise connected with the power supply lines 111 and may have included therein various automatic switches such as 116, 117 and 118.

The operation of the system illustrated in Fig. 10 is as follows:

The push button 108 is operated for releasing the automatic valve 103 and causing a fuel flow through the pilot line 100 to the pilot burner 101 which is then ignited in the usual way, producing the flame 104. The fan 112 is now started, or may have been previously started, which, when the proper volume of air or velocity or flow of air is set up in the pipe or conduit 114, closes the switch 113. The other safety switches 116, 117 and 118 are now closed or cut in, depending upon their position in the system. The flame 104, acting on the electrode rod 105, causes current to flow through the relay 106, which in turn causes a current to flow from the power lines 111 through the lead 69 and air flow switch 113 therein, solenoid 68, leads 68 and 110, relay 106, line 115 and automatic switches 116, 117 and 118, to the power lines 111. At this time the safety valve 95 may be manually operated to start a flow through the pipe 96.

The operation of the safety valve is as follows:

With the current shut off from the solenoid 66, the parts are in the positions illustrated in Fig. 2, with the valve disc 81 closed, preventing a flow through the valve body 78, and with the operating handle 21 downwardly inclined, as shown in Fig. 2. Should the handle 21 now be operated, the first movement would be from the position of Fig. 2 to the solid line position of Fig. 3, which would mean that the carrier 41 is actuated through the actuation of the shaft 30 20, as are the parts mounted on said carrier, except the beam 58 and parts associated therewith. The reason the beam and parts carried thereby would not be operated, is because the counter weights 60 and 61 hold said beam in the position illustrated in Fig. 2, pulling the movable core 65 out of the solenoid 66 to the position shown. During the movement of the carrier, and with the beam in the position shown, the beam knock out pin 59 engages the finger or lug 53 of the forked member 52 holding same stationary at just about the time the biased arm pin 51 would be in the notch 40 of the segment plates 27 and 28, whereby continued movement of the carrier causes the biased arm 50 to be oscillated in a counterclockwise direction to elevate its pin 51 above the notch and provide a space below the pin and the top surfaces of the segment plates, such as is illustrated at 119 in Fig. 3.

Continued movement of the lever 21 in a valve opening position, such as is illustrated in dot and dash lines in Fig. 3, causes the biased arm pin 51 to ride over the top of the roller 39 and rest on the upper edges of the segment plates beyond the roller 39 without opening the valve, all as illustrated in dot and dash lines in Fig. 3.

Should, however, the operating system be in proper condition, such as described above in connection with Fig. 10, and the solenoid 66 energized, the movable core 65 will be definitely and positively held within the solenoid, so that when the lever 21 is actuated from the position of Fig. 2 to the solid line position of Fig. 4, all of the parts move as a unit, with no independent relative movement therebetween. This allows the biased arm 50 to hold its pin 51 on the upper edges of the segment plates 27 and 28 and causes said pin to definitely and solidly lodge in the notch 40, thereby establishing a positive connection between the carrier 41 and segment plates 27 and 28. Further movement of the handle 21 causes the shifting of all the parts of the control mechanism from the position illustrated in Fig. 4 to that illustrated in Fig. 5. It should be noted that for clearance in the drawings and understanding of the operation of the parts, the segment plates 27 and 28 are illustrated in their final position in dot and dash lines in Fig. 4, and with the other parts of the control mechanism in the positions illustrated in solid lines in Fig. 5. When the parts reach this position, the nose 73 of the pawl 71 of the carrier 41 drops behind the abutment or shoulder 74 on the base lug 18 for holding the parts in this position.

It will be understood that the movement of the segment plates 27 and 28 from the solid line position of Fig. 4 to the dot and dash line position thereon stretches or expands and tensions the spring 33, and at the same time downwardly shifts the link 37, which, through the lever 86, valve stem 84 and arm 82, opens the gate valve disc or discs 81 to the position shown in Fig. 5, so that a flow through the valve body 78 occurs.

The valve and its operating mechanism remains in this position until the operation of the mechanism in Fig. 10 is shut off, or until the failure of some part of the power system. The system may be shut off by closing the valve 99 in the fuel line, or by closing the valve 102 in the pilot line, or the system may fail to operate due to a failure of power in the power lines 111 or the power lines 107, or the failure may occur due to the stoppage of flow of air through the pipe or conduit 114 or due to the going out of either the main burner flame or the pilot flame 104, thereby, in each of the last mentioned failure causes, resulting in a stoppage of current flow through the electrical system and particularly the leads 68 and 69 of the solenoid 66. It will be understood of course that other possible current flow failures may occur and in each instance resulting in a current failure in the leads 68 and 69, and thereby a deenergizing of the solenoid 66.

Regardless of what causes the failure of current, the deenergization of the solenoid 66 releases or unlatches the core 65, whereupon the counter weights 60 and 61 actuate the beam 58 in a counterclockwise direction, causing the beam knock out pin 59 to engage the finger or lug 53 of the forked member 52 for oscillating the rock shaft 49 in a counterclockwise direction, thereby raising the biased arm 50 from the position illustrated in Fig. 5 above the roller 39 and thereby releasing the connection of the segment plates 27 and 28 with the carrier 41. It should be noted, and as clearly seen in Fig. 5, there is a clearance between the beam knock out pin 59 and the finger or lug 53, which permits the counterweights 60 and 61 to develop a bit of momentum after being released, wherefore the knock out pin 59 strikes the lug or ear 53 with a reasonable blow for releasing the biased arm pin 51.

The release of the segment plates 27 and 28 permits the tensioned spring 33 to return these segment plates from their dot and dash line position of Fig. 4 to the solid line position of Fig. 2 and through the link 37 and above described, connecting to the valve disc or discs 81 for returning said valve disc or discs to their final position, and stopping flow through the valve body 78. Just before the segment plates reach the position illustrated in Fig. 2, the pin 75 carried thereby and projecting rearwardly thereof engages with the pawl 71 for dislodging its nose 73 from shoulder 74, so that the carrier 41 and parts carried thereby are then returned to the position illustrated in Fig. 2. The movement of the carrier 41 is effected by the counterweights 60 and 61, but in order to insure the proper return of these parts, the torsional spring 92 likewise effects the counterclockwise movement of the shaft 20 and the carrier 41.

The movement of the counterweights 60 and 61 and the parts associated therewith is interrupted by the inclined wedges 77, while the carrier continues in this counterclockwise direction of movement until the core 65 is again completely sheathed within the solenoid 66 and thereby placing the parts in the position illustrated in Fig. 2. It should be noted that with this type of construction, the surface of the core 65 and the interior of the solenoid 66 are at all times protected against accumulation of dirt, grit or the like, which may be gathered thereon should they remain continuously exposed as when in the positions illustrated in Fig. 3.

Figure 9:
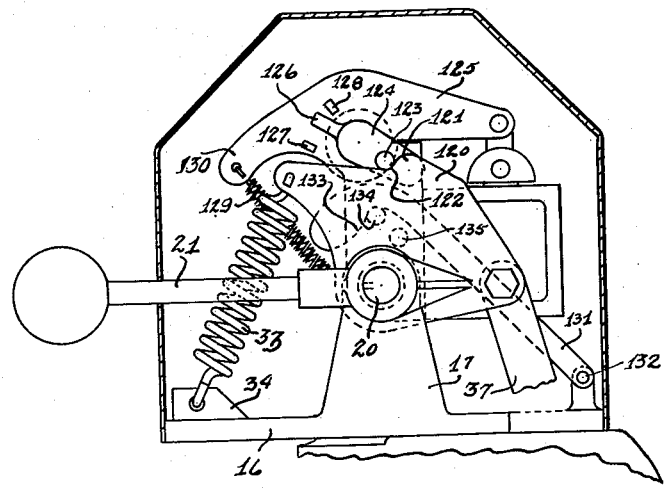
Fig. 9 is a view similar to Fig. 5, showing a slight simplification in the construction of the control mechanism; and, Fig. 10 is a diagrammatic view, illustrating some of the possible uses for the control valve of this invention.

The valve operating mechanism illustrated in Fig. 9 is, to all intents and purposes, substantially identical with that above described, except that some of the parts have been combined and a substitution made of a spring for the counterweights 60 and 61. The parts are illustrated in a valve opened position, such as that illustrated in Fig. 5, and comprises the base plate 16 from which upstands the lugs 17, 18 and 19, only the first of which is illustrated. Journaled in said lugs, as above noted, is the shaft 20, having secured thereto the handle 21. Loosely mounted on the shaft 20 is a segment plate 120 which has connected to one end thereof the spring 33, which spring is in turn anchored to the base plate through the lug 34. The other end of the segment plate 120 has a pivotal connection with the valve operating link 37.

The segment plate 120, instead of having the roller 39, is merely provided with an enlarged portion 121 which is immediately preceded by a notch 122, into which the pin 123 of counterweighted or biased arm 124 engages. The arm 124 has a rock shaft projecting therefrom, oscillatably mounted in a carrier, but instead of utilizing the forked member 52 and beam knock out pin 69, these parts are directly formed on the arm 124 and the beam 125. As seen, the arm 124 has a tail 126 projecting therefrom which lies between lugs 127 and 128 projecting forwardly of the beam 125.

Instead of the counterweights 60 and 61, use is made of a spring 129 which has one end secured to the end 130 of the beam 125, and its other end suitably anchored to the carrier member. A further change in construction, illustrated in Fig. 9, is the use of a latch 131 instead of a pawl 71. The latch 131, has its lower end pivoted at its end 132 to a lug upstanding from the base plate 113 and its other end hooked, as at 133, for engagement with a pin 134 projecting forwardly of the carrier member. A latch dislodgement pin 135 is carried by the segment plate 120 for releasing the latch under proper conditions.

It is believed that a description of the operation of this modified structure is unnecessary in view of the above minute description of the preferred form shown in the other views of the drawings. It need only be remembered that the spring 129 operates the beam 125 in the same manner that the counterweights 60 and 61 operate the beam 58, and that the beam 125 performs the same functions through the projections 127 and 128 and tail 126 of biased arm 124 as the knock out pin 52 and biased arm 50 perform above.

It is believed that the foregoing fully discloses the construction and operation of the improved valve of this invention, and that the objects initially set forth are fully realized.

What is claimed is:

1. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, yielding means for actuating the actuator from an opening to a closing position which was tensioned during the operation of the actuator by the lever, and means operable upon de-energization of the electromagnetic means for removing the latch pin from the actuator notch.

2. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, yielding means for actuating the actuator from an opening to a closing position which was tensioned during the operation of the actuator by the lever, and means operable upon de-energization of the electromagnetic means for removing the latch pin from the actuator notch, comprising impositive means operable to oscillate the biased arm and thereby remove the pin from the actuator notch.

3. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, yielding means for actuating the actuator from an opening to a closing position which was tensioned during the operation of the actuator by the lever, means operable upon de-energization of the electromagnetic means for removing the latch pin from the actuator notch, comprising an oscillatable beam connected at one end with the electromagnetic means, and counterweight means on the beam for oscillating same upon release of the electromagnetic means for oscillating the biased arm and removing the pin from the actuator notch.

4. In a valve control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, yielding means for actuating the actuator from an opening to a closing position which was tensioned during the operation of the actuator by the lever, means operable upon de-energization of the electromagnetic means for removing the latch pin from the actuator notch, comprising a pivotally mounted beam on the carrier having one end connected with the electromagnetic means to retain same in inoperative position, and spring means at the other end of the beam for oscillating same about its pivot upon release of the electromagnetic means and for oscillating the biased arm removing the latch pin from the actuator notch.

5. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, and a pawl for locking the carrier and actuator in the opening position.

6. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, a pawl for locking the carrier and actuator in the opening position, yielding means for actuating the actuator from opening to closing position which was tensioned during the operation of the actuator by the lever, and means operable upon deenergization of the electromagnetic means for removing the latch pin from the actuator notch.

7. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, a pawl for locking the carrier and actuator in the opening position, yielding means for actuating the actuator from opening to closing position which was tensioned during the operation of the actuator by the lever, means operable upon deenergization of the electromagnetic means for removing the latch pin from the actuator notch, and means operable during the movement of the actuator to a closing position for releasing the pawl to permit return of the carrier and lever to their closing positions.

8. In a control mechanism of the class described, the combination of an actuator having a notch thereon, a carrier, a lever connected with the carrier, a biased arm on the carrier having a latch pin adapted to engage the notch in the actuator, electromagnetic means for retaining the latch pin in the notch whereby movement of the lever and carrier effects the operation of the actuator from a closing to an opening position, a pawl for locking the carrier and actuator in the opening position, yielding means for actuating the actuator from opening to closing position which was tensioned during the operation of the actuator by the lever, means operable upon deenergization of the electromagnetic means for removing the latch pin from the actuator notch, means operable during the movement of the actuator to a closing position for releasing the pawl to permit return of the carrier and lever to their closing positions, and yielding means for returning the carrier and lever to said closing position.

9. In a device of the class described, the combination of an actuator operable from a first to a second position, yielding means for actuating the actuator to the first position, a lever, a carrier associated with the lever, connecting means on said carrier normally inoperative for operative engagement with the actuator, electromagnetic means for rendering the connecting means operative and for retaining the connecting means in connecting position whereby operation of the lever will actuate the actuator from said first position to a second position, a latch for retaining the actuator in the second position, and means on said carrier operable for rendering the connecting means inoperative upon de-energization of the electromagnetic means whereby the yielding means actuates the actuator to its first position, and means associated with the actuator for releasing the latch and operable during the movement of the actuator from its second to its first position.

NORMAN M. FOSTER.